United States Patent [19]

Nyström et al.

[11] Patent Number: 5,982,766
[45] Date of Patent: Nov. 9, 1999

[54] POWER CONTROL METHOD AND SYSTEM IN A TDMA RADIO COMMUNICATION SYSTEM

[75] Inventors: Johan Nyström, Stockholm, Sweden; Stefan Bruhn, Nuernberg, Germany; Erik Ekudden, Åkersberga, Sweden; Karl Hellwig, Wonfurt, Germany

[73] Assignee: Telefonaktiebolaget LM Ericsson, Stockholm, Sweden

[21] Appl. No.: 08/845,466

[22] Filed: Apr. 25, 1997

[30] Foreign Application Priority Data

Apr. 26, 1996 [SE] Sweden .................................. 9601606

[51] Int. Cl.$^6$ .................................................. H04B 7/212
[52] U.S. Cl. .......................... 370/347; 455/553; 455/522
[58] Field of Search .................................... 370/332, 252, 370/468, 472, 522, 465, 337, 347, 311; 455/522, 69, 553

[56] References Cited

U.S. PATENT DOCUMENTS

| 4,417,102 | 11/1983 | Allen ........................................ 704/227 |
| 5,353,373 | 10/1994 | Drogo de Iacovo et al. .......... 704/223 |
| 5,469,527 | 11/1995 | Drogo de Iacovo et al. .......... 704/220 |

FOREIGN PATENT DOCUMENTS

| WO94/07313 | 3/1994 | WIPO . |
| WO94/19882 | 9/1994 | WIPO . |
| WO97/13388 | 4/1997 | WIPO . |

OTHER PUBLICATIONS

J. Dunlop et al., "Estimation of the Performance of an Adaptive Air Interface in Mobile Radio," Alcatel Radiotelephone, pp. 1–5.

D.J. Goodman et al., "Quality of Service and Bandwidth Efficiency of Cellular Mobile Radio with Variable Bit–Rate Speech Transmission," IEEE (1983).

J. Irvine et al., "Implementation Considerations for Gross Rate Link Adaptation," IEEE, pp. 1766–1770 (1996).

E. Le Strat et al., "Distance Based Dynamic Adaptation of the Air Interface in TDMA," Alcatel Mobile Communication France, pp. 208–215.

Dunlop, J. et al., "Estimation of the Performance of Link Adaptation in Mobile Radio," IEEE Vehicular Technology Conference, VTC–95, pp. 326–330 (1995).

Yuen, E. et al., "Variable Rate Speech and Channel Coding for Mobile Communication," IEEE Vehicular Technology Conference, VTC–95, pp. 1709–1713 (1994).

Sato, Yayoi, Japanese Abstract 63–276115, "High Efficiency Voice Encoder", NEC Corporation, May 10, 1990.

*Primary Examiner*—Alpus H. Hsu
*Assistant Examiner*—Mitchell Slavitt
*Attorney, Agent, or Firm*—Burns, Doane, Swecker & Mathis, L.L.P.

[57] ABSTRACT

A power control system in a TDMA radio communication system has traffic channels which are associated with a set of speech/channel encoding modes. Each mode has a different mix of speech encoder bit rate and data protection bit rate but the same total available gross bit rate. The transmitter includes a power control unit that replaces a mode allocated to a channel by another mode having either a higher or a lower data protection bit rate and either a lower or a higher speech encoder bit rate if the sound to be encoded requires either a lower or a higher speech encoding bit rate. The power control unit also controls a power adjustment unit that either reduces or increases the output power of the transmitter to a lower or a higher level such that an estimated decoded speech quality measure at the receiver is substantially constant.

12 Claims, 9 Drawing Sheets

POWER CONTROL METHOD AND SYSTEM IN A TDMA RADIO COMMUNICATION SYSTEM

The present invention relates to a power control method and system in a TDMA radio communication system.

BACKGROUND

TDMA based digital cellular communication systems, like GSM and D-AMPS, have a fixed rate speech encoder delivering data packets of fixed size to a channel encoder that encodes the data packets up to some given (fixed) total gross bit rate (the total bit rate available for information transfer on a given channel if no channel protection is provided). This scheme gives a certain degree of channel protection that is close to optimal for some conditions but not for others. For example, on good channels bandwidth is wasted on unnecessarily strong channel encoding and on bad channels the channel encoding may be too weak. Furthermore, since the same transmission power is used in both cases, unnecessary interference is produced in the first case, while insufficient transmission power may be provided in the second case.

It has also been suggested [1, 2] to use dynamically changing encoding modes with different mixes of speech/channel encoding suitable for different radio environments.

SUMMARY

An object of the present invention is to provide a method and system that reduces the average interference level produced by a transmitting subscriber without substantial reception quality loss at a receiving subscriber.

This object is solved by a method and system in accordance with the appended claims.

Briefly, the present invention adapts the encoding to the current source signal and uses the coding gain/loss (as compared to the fixed mode encoding described above) to decrease/increase output power. On the average this will reduce the overall interference level in the system and therefore increase system performance.

BRIEF DESCRIPTION OF THE DRAWINGS

The invention, together with further objects and advantages thereof, may best be understood by making reference to the following description taken together with the accompanying drawings, in which.

DETAILED DESCRIPTION

The present invention will be described with reference to TDMA systems, in particular to the European GSM system. However, it is to be understood that the same principles may be used also for other TDMA systems, such as the American system in accordance with the standards IS-54 and IS-136.

The present invention comprises a combination of two essential features, namely a mechanism for switching between different encoding modes and a mechanism for adjusting the output power of a transmitter. These two features will now be described in detail.

MODE SWITCHING

Mode switching will now be described in detail. First the general concept of mode switching will be explained with reference to a dynamically changing radio environment (radio environment controlled mode switching), since this example is easily understood. Thereafter the same concept will be applied to source signal controlled speech encoding (source signal controlled mode switching). Finally both examples will be combined.

Radio Environment Controlled Mode Switching

Figure 1:
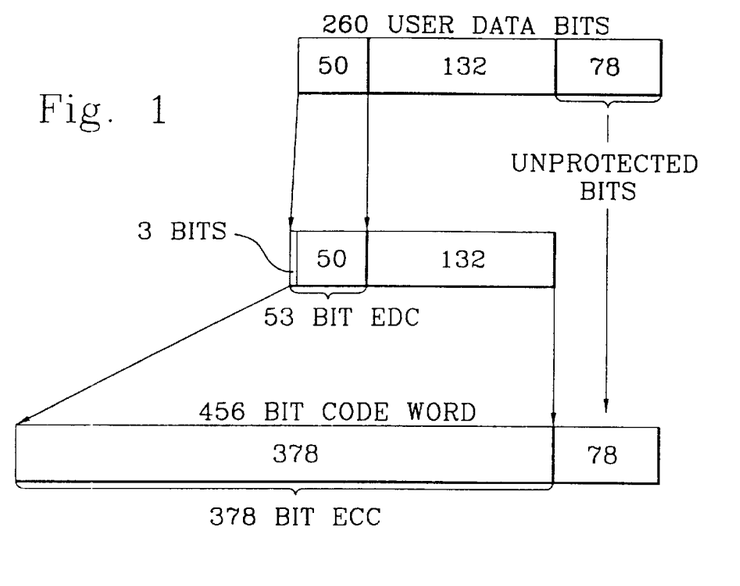
FIG. 1 is a schematic diagram illustrating channel encoding in GSM.

FIG. 1 illustrates the data format of a speech frame in the European GSM system. The speech frame consists of 260 bits of user data (encoded speech). These 260 bits have been divided into three different classes depending on their sensitivity to bit errors. The more sensitive bits are provided with more error protection than the less sensitive bits. The 50 most sensitive bits are protected first with a 3 bit errors detecting code (EDC), and then the resulting 53 bits along with the 132 next most sensitive bits are encoded with an error correcting code (ECC) up to 378 bits. The remaining 78 bits are transmitted without channel protection of any kind. Thus, the final code word representing the original speech frame will consist of 456 bits.

At the receiver the decoder extracts the 78 unprotected bits and performs error correction on the remaining 378 bits. Errors among the 78 unprotected bits are neither detected nor corrected. Errors among the 132 channel protected bits are rare due to the error correction, but when they occur they are impossible to detect. Finally, errors in the 50 most sensitive bits are likely to be detected by the 3 bit error detection code.

Figure 2:
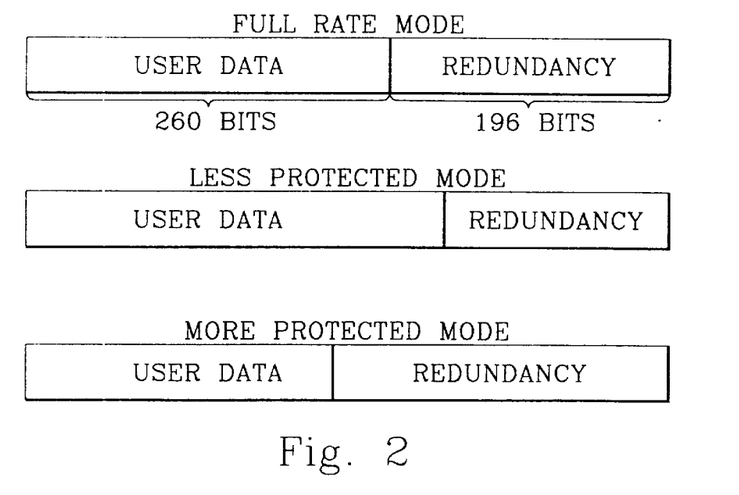
FIG. 2 is a schematic diagram illustrating three coding modes having different data protection but the same gross bit rate.

As illustrated in FIG. 2 this channel encoding scheme for a GSM full rate channel implies that a certain amount of redundancy is added to the user data that is to be transmitted. However, within the same total available gross bit rate it is possible to use other proportions between user data and redundancy. Thus, if radio conditions are good it may be possible to reduce the data protection and thereby the redundancy. Since the total gross bit rate is assumed to be constant, this means that more bits are available for user data. This is illustrated by the data block in the middle of FIG. 2. Since more user data bits now are available, a more accurate speech encoding algorithm (that requires more bits) may be used, thereby increasing the quality of the speech decoded at the receiver. On the other hand, if the radio conditions are poor it may be necessary to increase the data protection. This leads to an increase in the number of redundant bits, and therefore to reduction of the number of bits used for speech encoding. In this case a less accurate speech encoding method has to be used. A data block representing such a more protected mode is shown at the bottom of FIG. 2. The advantage of such a mode is that the added data protection increases the probability of correctly receiving and decoding the encoded speech. The argument for this is that it is preferable to correctly receive speech encoded with somewhat lower accuracy than to incorrectly receive speech encoded with higher accuracy. The perceived speech quality at the receiver will still be better in the first mentioned case.

Figure 3:
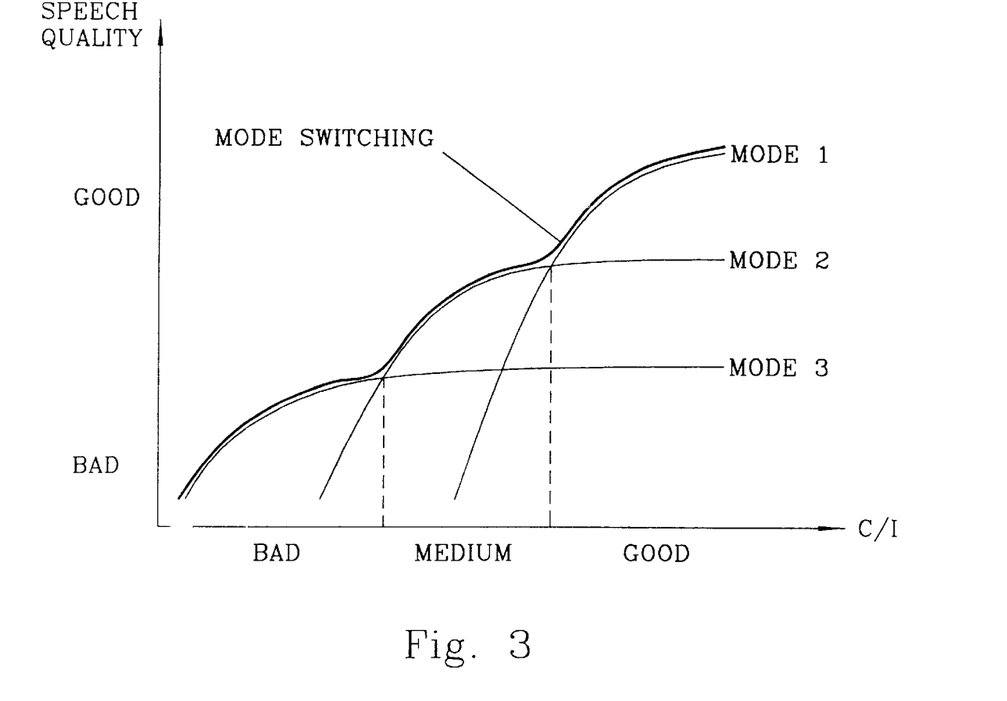
FIG. 3 is a diagram illustrating the concept of mode switching, which is an important feature of the present invention.

FIG. 3 illustrates how mode switching improves performance. The curve denoted MODE 1 represents the characteristics of a mode with high bit rate speech encoding and low redundancy. This mode gives good perceived speech quality at the receiver when the radio conditions are good. As the radio conditions degrade (C/I decreases) the perceived speech quality will be reduced due to frequently occurring bit errors. Here it would be better to use MODE 2, which uses a more compact speech coding algorithm, but protects the transmitted bits better from errors caused by the channel. As the radio conditions degrade further, the speech encoding algorithm is once again changed to MODE 3, which produces few user data bits and protects them even better against the deteriorating channel. Thus, if mode switching is used the optimum portions of the curves representing MODE 1, MODE 2 and MODE 3 may be used, as indicated by the thick solid line in FIG. 3.

From the above discussion it is clear that mode switching is a desirable feature. However, before this feature can be implemented it is necessary to find a way to synchronize the encoder in the transmitter with the decoder in the receiver. In other words, the receiver must know which mode to decode after a mode switch in the transmitter. Furthermore, it is usually desirable to have the receiver changed to the same encoding mode on the return link from the receiver to the transmitter (one reason for this is that the path loss is the same in both directions). Methods for such a mode synchronization will now be described with reference to FIGS. 4–6.

Figure 4:
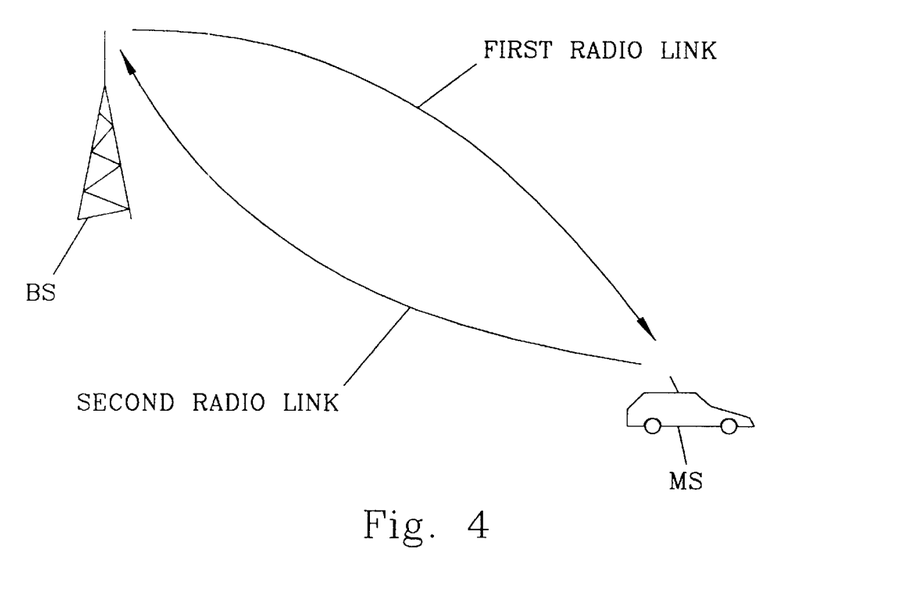
FIG. 4 illustrates a context in which mode switching is used.

FIG. 4 illustrates a typical scenario. A base station BS transmits speech data to mobile MS over a first radio link. Mobile MS transmits speech data back to base station BS over a second radio link. Base station BS continuously monitors the local radio environment around the station. This radio environment may be influenced by, for example, propagation fading, shadow fading, Rayleigh fading, interference situations, system load and/or received signal strength. In the GSM system a base station (and also the mobile station) has access to measurements like the RxQual and RxLev parameters, which estimate the received bit error probability and received signal strength, respectively. Based on one or several of such parameters base station BS may form a measure to decide which encoding mode to use on the first radio link. Base station BS instructs the speech encoder to switch to the corresponding speech encoding mode and also instructs the channel encoder to switch to the corresponding channel encoding mode. Here it is assumed that the speech encoder is capable of handling different encoding rates, i.e. a variable rate encoder. Alternatively it may comprise an embedded encoder (see [1,2] and the description of FIG. 8 below), such that the channel encoder may remove information from a fixed rate speech encoded data stream for obtaining different speech encoding modes.

Mobile station MS receives the transmitted code word, which may be corrupted by the first radio link. In order to be able to perform proper speech decoding at mobile station MS, the channel decoder has to deliver proper user data to the speech decoder. Thus, the receiver has to decide which mode actually was used by base station BS. This can be done in several ways.

Figure 5:
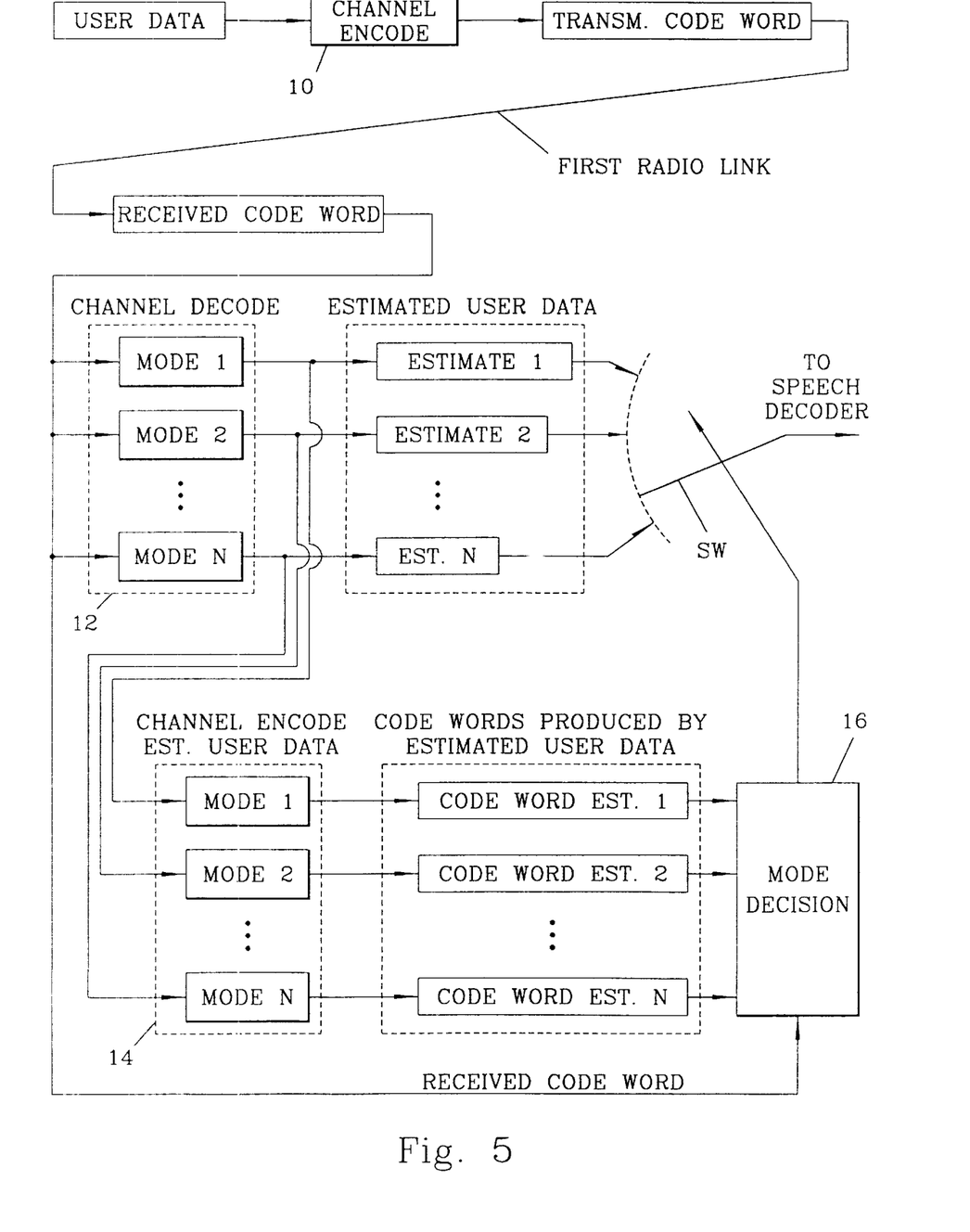
FIG. 5 is a combined block and data diagram illustrating a preferred process for identifying an encoding mode at a receiver.

FIG. 5 illustrates a preferred embodiment of a coding mode identification method. In this method the (possibly corrupted) received code word is channel decoded in every possible mode N by performing the usual decoding steps for each respective mode. This step is represented by block 12. The result is N estimates of the originally transmitted user data, one estimate for each mode.

In the next step these estimates are used for channel encoding in block 14. The purpose of this channel encoding is to produce code word estimates corresponding to each user data estimate. These code word estimates are used in a mode decision represented by block 16. This mode decision is based on a comparison of each code word estimate with the actually received code word. The code word estimate that best matches (for example, has the fewest differing bits) the received code word is considered to be the correct code word, and the corresponding user data estimate is chosen by a switch SW and transferred to the speech decoder. The speech decoder may switch to the corresponding speech decoding mode by measuring the length of the received user data. As an alternative block 16 may also control the speech decoding mode.

When mobile station MS has determined the received mode it may be synchronized with base station BS by switching to the same encoding mode on the second radio link.

Blocks 12, 14 and 16 in FIG. 5 are preferably implemented by one or several micro processors or micro/signal processor combinations.

Figure 6:
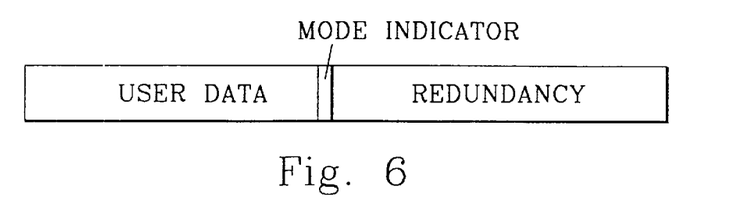
FIG. 6 is a data diagram illustrating another method of conveying encoding mode information to a receiver.

In the above examples the received mode has been detected by trial decoding of several mode candidates. Another possibility would be to convey the mode information directly in a mode code word separated from the data code word, either in the same transmitted frame or in a separate information channel. Mobile station MS would then be able to decide which mode to use by decoding the mode code word first and then only channel and speech decode the indicated mode. A typical format of such a transmitted code word is illustrated in FIG. 6. This method has the advantage of being less complex, but also has the disadvantage of taking up part of the available bandwidth for signaling purposes.

In the above description mode switching was controlled by fluctuations in radio conditions. Another parameter of interest is traffic load, since this parameter will influence the radio conditions (more traffic generates more interference and therefore worse radio conditions). Thus it is possible to control mode switching by either radio conditions, traffic load, or both.

Source Signal Controlled Mode Switching

An important feature of the present invention is the fact that the source signal itself is dynamically changing character. Thus, different speech encoding algorithms may be used for different types of sounds. Since these different algorithms usually produce different speech encoding rates, the above described concept of mode switching may be used. Thus, in this case mode switching is controlled by the source signal itself. Known methods to change the source or speech encoding rate are illustrated in FIGS. 7 and 8.

Figure 7:
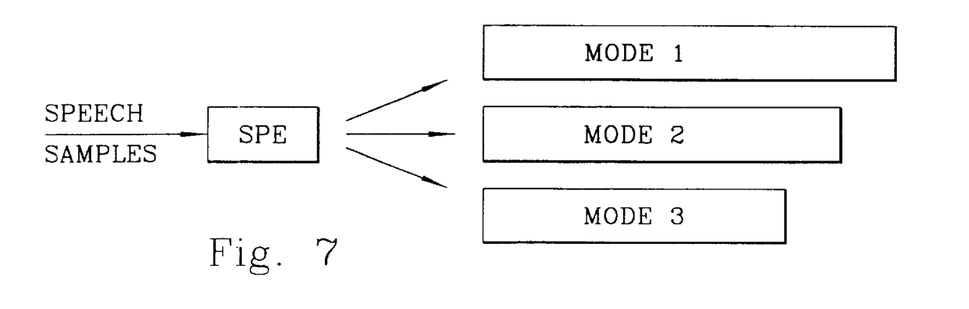
FIG. 7 is a schematic diagram illustrating a variable rate speech encoder having different source signal encoding modes.

FIG. 7 illustrates variable rate coding. Speech samples are forwarded to a speech encoder SPE, which encodes the incoming bit stream into different bit rates or modes. In this case the speech encoder SPE has to be informed about which rate to use for encoding.

Figure 8:
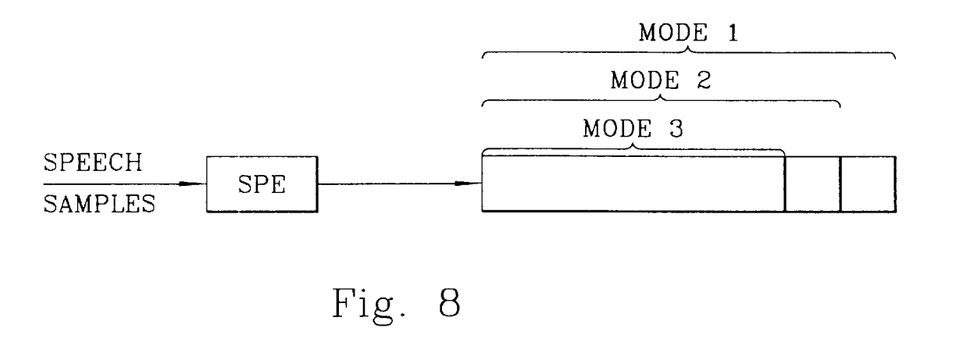
FIG. 8 is a schematic diagram illustrating a speech encoder using embedded source signal encoding.

FIG. 8 illustrates another method, namely embedded speech encoding. This method is described in detail in references [3,4]. In this case the speech samples are encoded into a constant rate bit stream. The encoding is performed in such a way that the most accurate encoding (MODE1) is obtained by retaining all of the bits from the encoder. Less accurate modes are obtained by discarding portions of the bit stream from the encoder. The advantage of this type of encoding is that the speech encoder does not have to be informed of which mode to use. Instead only the channel encoder has to be informed of the selected mode and thereafter extracts the corresponding information from the bit stream from the speech encoder.

Figure 9:
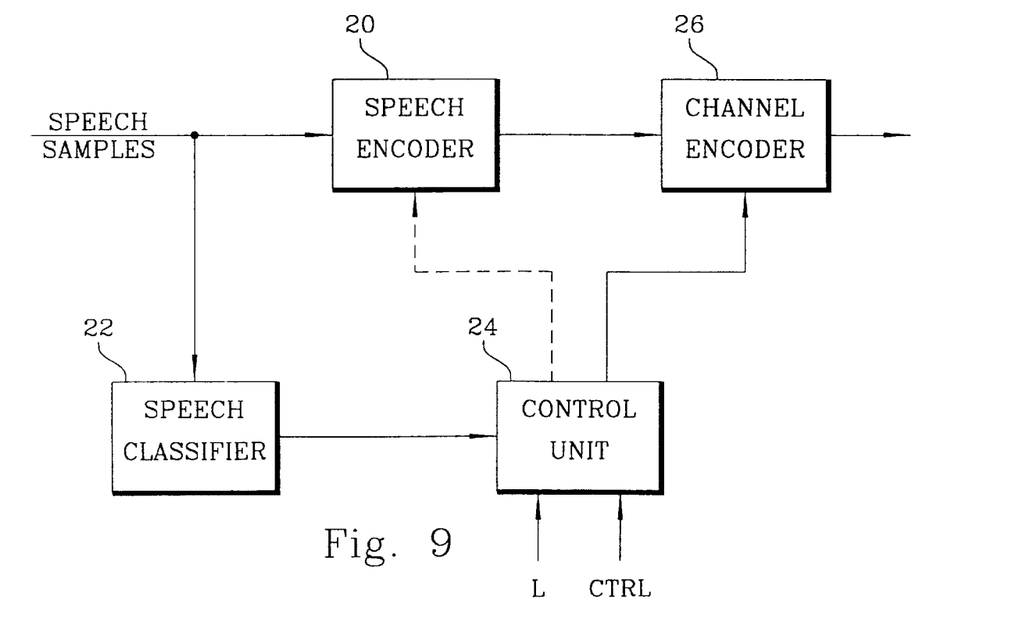
FIG. 9 is a block diagram illustrating a transmitter configured to perform source signal controlled mode switching.

FIG. 9 is a block diagram illustrating a transmitter configured to perform source signal controlled mode switching. Speech samples are forwarded to a speech encoder 20, which may be of the variable rate or embedded code type, and to a speech classifier 22. Speech classifier 12 determines the type of sound to be encoded. Different types of sound are, for example, voiced speech (for example "A", "E"), unvoiced speech ("S", "F"), background sounds (like car noise), music, etc. Each type of sound is associated with its corresponding class of encoding algorithms that are particularly suited for that type of sound. A control unit 24 is informed of the determined type of sound. Control unit 24 uses this information as well as local (L) information, such as time of day, date, location, system load, etc, and transmitted (CTRL) information to decide on which speech/channel encoding mode to use within the determined class. If radio conditions are good a mode with accurate encoding of the source signal and a low channel encoding overhead is used. If radio conditions are poor a more robust mode with less accurate source encoding and a higher channel encoding overhead is used.

Control unit 24 forwards the mode decision to channel encoder 26. If an embedded speech encoder is used there is no need to inform speech encoder 20. On the other hand, if a variable rate speech encoder is used encoder 20 will also be informed of the mode decision. This case is indicated by the dashed connection between control unit 24 and speech encoder 20 in FIG. 9.

The various blocks in FIG. 9 are typically implemented by a micro processor or a micro/signal processor combination.

Instead of using a fixed allocation of source and channel encoding as in the prior art, the idea of the present invention is to use a dynamically varying mode scheme within the same fixed gross bit rate, where the overall goal is to achieve the highest possible perceptual quality on the receiving end. The mode decision depends on the current speech class and is taken on a frame by frame basis, and is preferably also based on information regarding the quality of frames that have previously been received by the receiver (to determine the most suitable mode in the determined speech class). Preferably each link also contains an inband control channel CTRL for transmission of measurements of received speech quality to the other end. Such measurements may include estimated residual bit error rate, frame erasure rate, measured signal strength and other radio channel related parameters at the receiving end. One or several of these parameters form a quality measure on which encoding mode decisions will be based. Similarly to FIG. 6 this control channel CTRL may be squeezed into the same frame as the useful information (mode indicator in FIG. 6). Thus, the source/channel encoding modes should, whenever possible, be designed in a way that leaves room for the control channel CTRL. This is, however, not always possible, as illustrated by FIG. 10.

Figure 10:
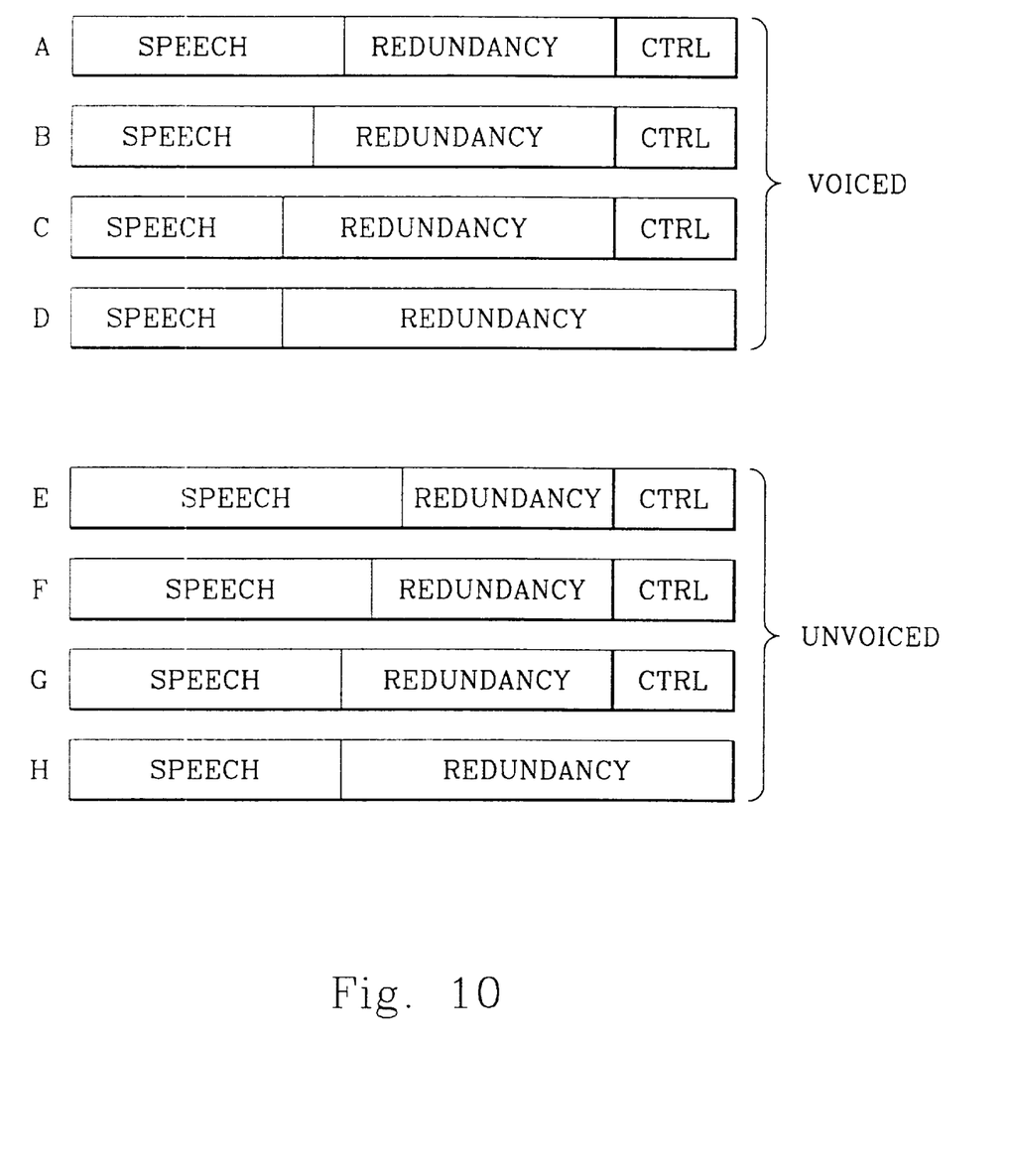
FIG. 10 is a schematic diagram illustrating different source signal classes and corresponding encoding modes.

FIG. 10 illustrates the frame formats of two classes of sound, namely voiced and unvoiced speech. The class "voiced" speech contains four encoding modes A–D. Mode A is characterized by accurate speech encoding and a low channel encoding overhead and also contains a control channel for transfer of measurements. This mode is used when radio conditions are good. Mode B is an intermediate mode in which the channel protection has been increased. Mode C is a mode in which the channel protection has been further increased to cope with a rather bad radio link. Note that modes A–C all contain a control channel. However, for a really poor radio channel it may be necessary to use very strong channel protection, and since it may not be possible to further reduce the speech encoding bit rate, the only possibility is to use a mode in which the control channel CTRL is discarded in favor of the channel protection (this may also be the case for some sources that require a higher bit rate). When there is no inband control channel available for transfer of quality information, the station at the other end will have to rely on the above mentioned local information in deciding which source/channel encoding mode to use in a determined source class. Here previously received and locally stored quality information may be used, since radio conditions usually are expected to remain constant over a few frames.

The class "unvoiced" speech contains similar encoding modes E–H. However, note that more bits may have to be used for speech encoding in this class due to a more complex structure of transient speech, non-stationary "unvoiced" speech or music, for example.

As noted above, there has to be a way for the receiver to determine the actually used mode for each frame. A simple method is the method illustrated in FIG. 6. In this embodiment a few bits of each frame are used as a mode indicator. An advantage of this method is that the receiver may determine the current mode simply by determining the value of mode indicator. However, this embodiment also has the drawback that the mode indicator requires bit space which has to be taken from the actual encoding of the useful signal.

Another signaling approach is to discard the mode indicator field and to use implicit signaling as described above with reference to FIG. 5. Implicit signaling means that the receiver has to determine the actually used encoding mode by analyzing the received frame.

It is also possible to use a combination of the above two explicit and implicit signaling methods. In this combined method a class indicator is used to indicate the actual class of encoding modes, while the receiver implicitly has to determine the actually used encoding mode within that class. Such a method would require only a few bits in the class indicator field and would also simplify the trial decoding in the receiver, since only a few encoding modes have to be trial decoded.

According to the present invention mode switching is primarily controlled by the source signal. However, as noted above the source signal may be divided into different classes, each class including several encoding modes. In a preferred embodiment the selection of appropriate mode within a class may therefore be controlled by the radio environment.

POWER CONTROL

An important feature of the above described mode switching methods is that a coding gain/loss is obtained by the different encoding modes. This coding gain/loss may be used to adjust the output power of a transmitter, as will now be described. As in the case of mode switching, radio environment controlled power control will be described first, since it is easy to understand and illustrates the concept well. Thereafter the concept will be generalized to source signal controlled power control. Finally a combination of these two examples will be described.

Figure 11:
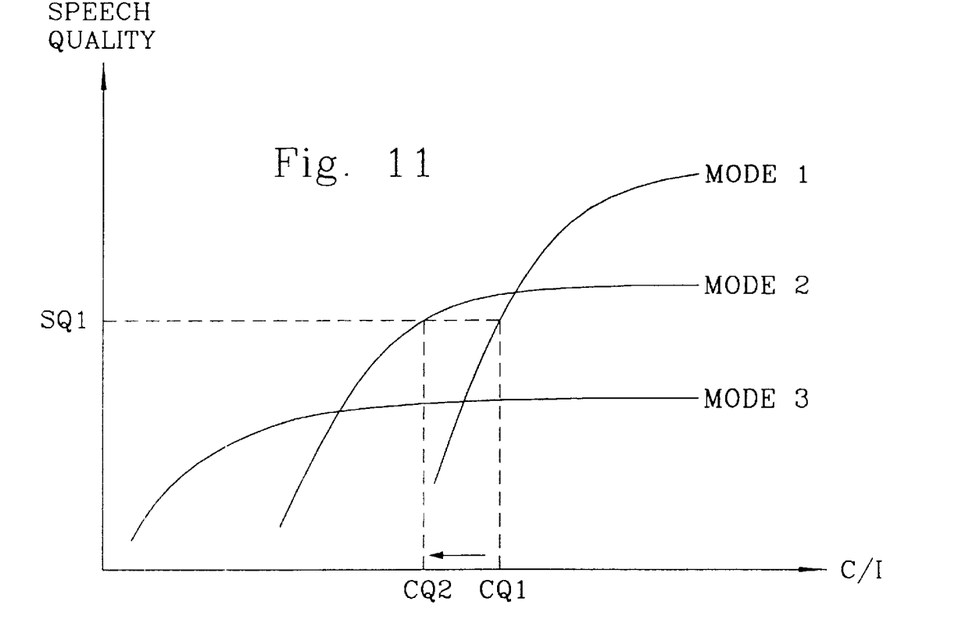
FIG. 11 is a diagram illustrating the concept of output power adjustment, which is another important feature of the present invention.

FIG. 11 is a diagram illustrating the concept of output power adjustment. Assume that the radio conditions have been such that MODE 1 has previously been used for encoding. Furthermore, assume that the radio conditions have now become worse and may be described by a C/I level CQ1. If MODE 1 is maintained this would give a speech quality level SQ1. It is assumed that level SQ1 is still an acceptable level. Thus, it is actually not absolutely necessary to switch to MODE 2, although this mode would give a more optimal speech quality. However, the same speech quality SQ1 may also be obtained by switching to MODE 2 and using the resulting coding gain to reduce the transmitting power, as indicated by the arrow. The reduced output power will reduce C/I to CQ2, but the obtained speech quality will still be SQ1 since the new encoding mode is MODE 2. If every transmitter in the TDMA system uses the coding gain obtained by mode switching to decrease output power the overall C/I level will increase, thereby improving the performance of the whole system.

Figure 12:
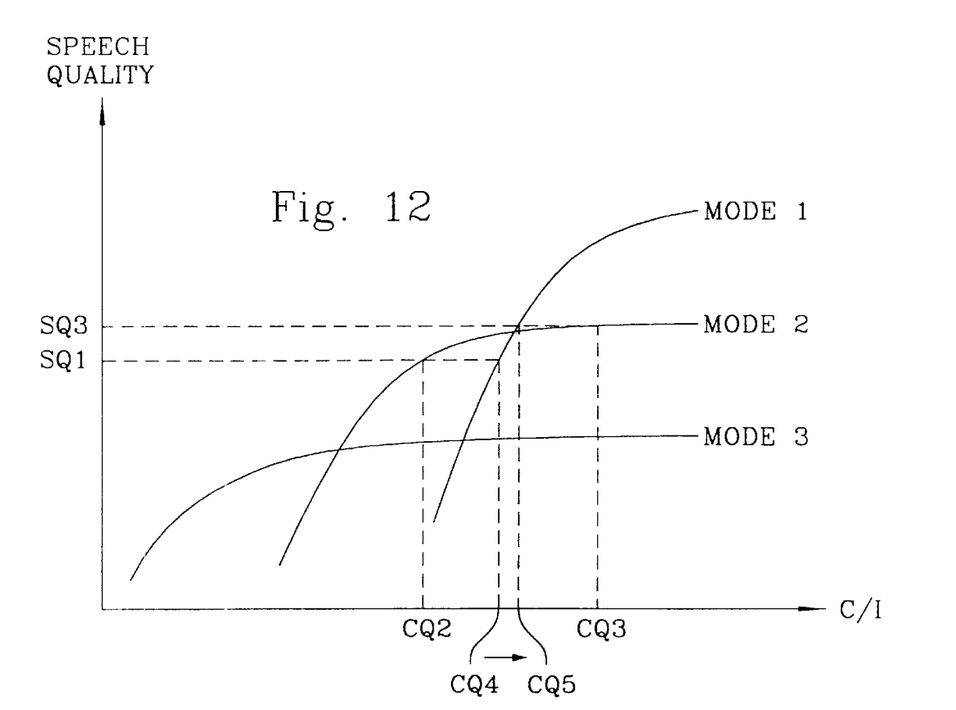
FIG. 12 is a diagram illustrating mode switching combined with output power adjustment in accordance with the present invention.

FIG. 12 is a diagram illustrating mode switching combined with output power adjustment in the reverse situation, namely when the radio conditions improve. Assume that MODE 2 has been used at a C/I level CQ2 and has given speech quality SQ1. Furthermore, assume that radio conditions have now improved to C/I level CQ3. If the mode remained the same the speech quality would slide up the curve MODE 2 to level SQ3. A mode switch to MODE 1 would only give the original speech quality SQ1 at C/I level CQ4. However, if this mode switch is combined with a slight output power increase (indicated by the small arrow) C/I would increase from CQ4 to CQ5 and the speech quality would slide up the curve MODE 1 to the same level SQ3. However, note that in this case speech quality SQ3 may be obtained at the lower C/I level CQ5 rather than the higher level CQ3 that is associated with MODE 2.

Figure 13:
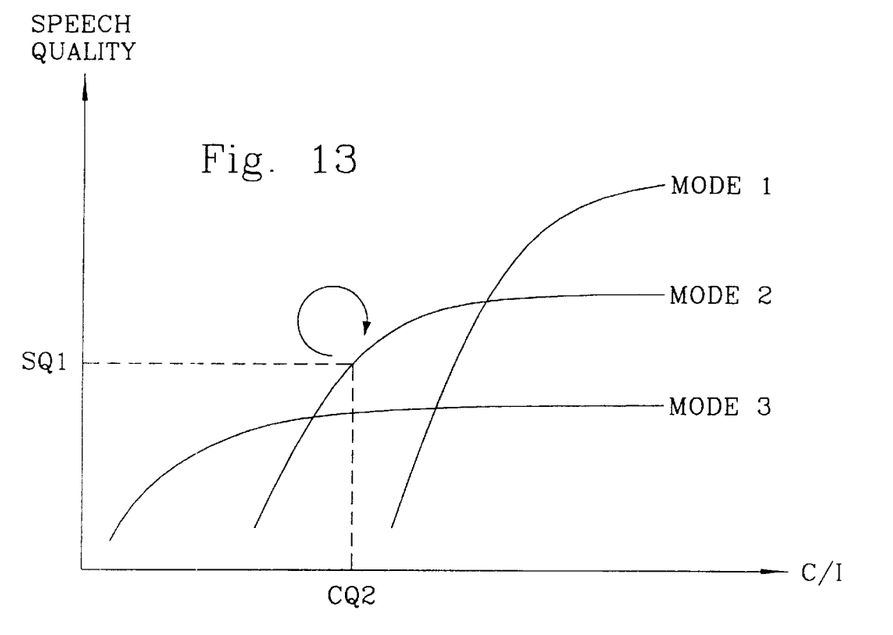
FIG. 13 is a diagram illustrating fine tuning of output power within the same encoding mode.

FIG. 13 is a diagram illustrating fine tuning of output power within the same encoding mode. As before SQ1 is considered an acceptable speech quality level lying on curve MODE 2 and being associated with C/I level CQ2. If radio conditions improve slightly the C/I level will increase slightly. If the output power is not changed the speech quality would slide up the curve MODE 2 to give a slightly better perceived speech quality. However, speech quality level SQ1 was already acceptable, which implies that the C/I increase may be used to slightly decrease output power instead, thereby contributing to better system performance. Thus, the output power may be reduced to bring the speech quality level back to SQ1. Similarly, if the radio conditions become slightly worse, so that the speech quality would slide down the curve MODE 2, the output power may be slightly increased to compensate for the reduced C/I level. These two cases are represented by the curved arrow in FIG. 13.

Figure 14:
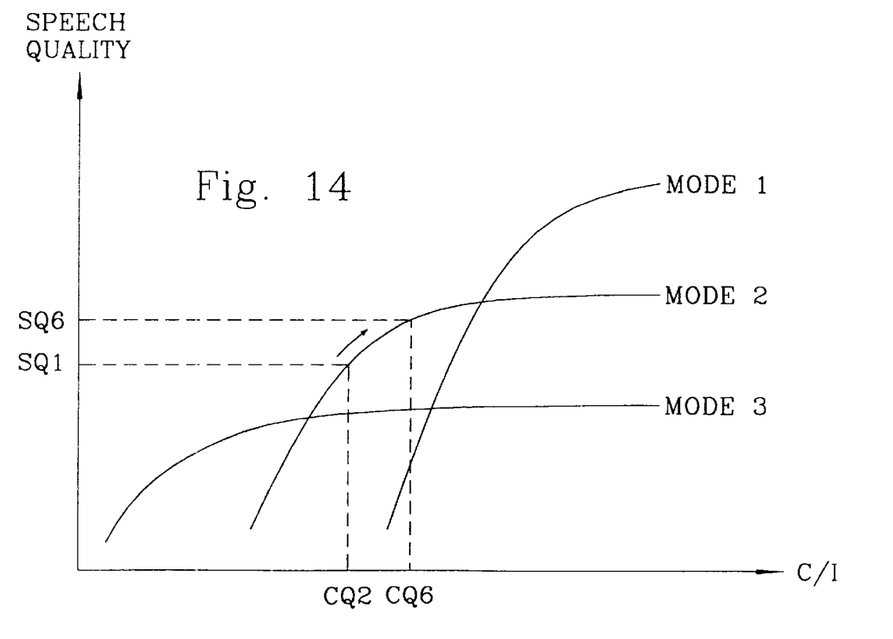
FIG. 14 is another diagram illustrating fine tuning of speech quality within the same encoding mode.

FIG. 14 is another diagram illustrating fine tuning of speech quality within the same encoding mode. As in FIG. 13 speech quality SQ1 is obtained in MODE 2 at C/I level CQ2. Furthermore it is assumed that the transmitter transmits at its minimum output power. Thus, if radio conditions improve to a C/I level CQ6 it is not possible to decrease the output power further as in FIG. 13. Instead the output power is kept constant, which will result in an improved speech quality level SQ6 by letting the speech quality slide up the curve MODE 2.

In the above description the changes in radio environment caused mode switches and corresponding output power adjustments. However, as noted above mode switches may also be caused by the source signal itself if source signal encoding is used. Also in this case the coding gain/loss associated with the differing amounts of available channel protection offered by each mode may be used for output power adjustments.

Since each source signal class may have several modes with different channel protection, as illustrated in FIG. 10, it is also possible to let the amount of output power adjustment depend on both source signal and radio environment as noted above. Thus, FIGS. 11–14 may be considered to illustrate mode changes within a source signal class as the radio environment changes.

Figure 15:
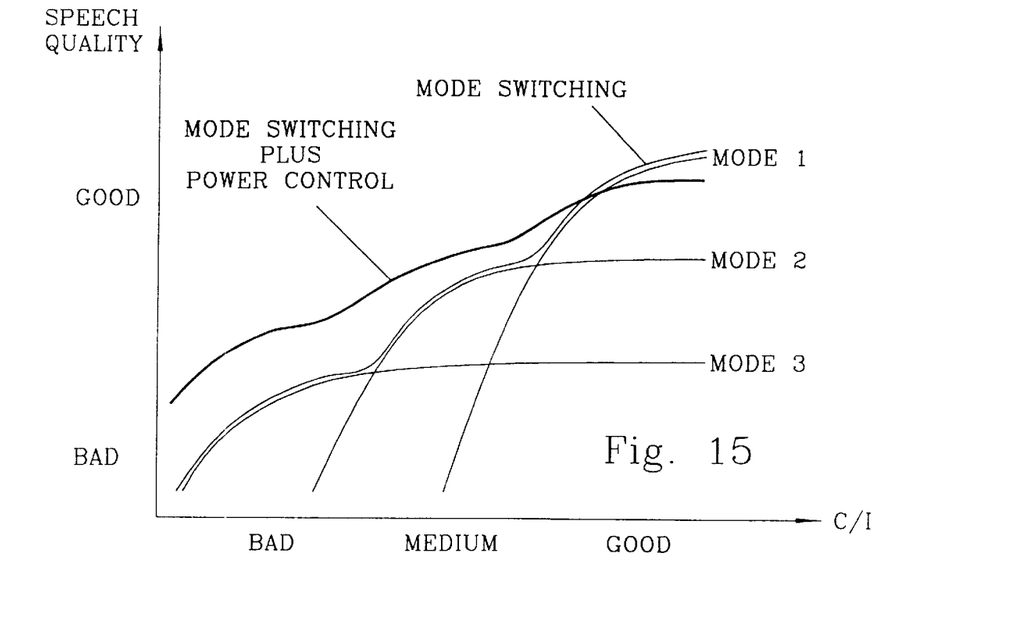
FIG. 15 is a diagram qualitatively illustrating the benefits of combined mode switching and output power adjustment in accordance with the present invention.

FIG. 15 is a diagram qualitatively illustrating the benefits of combined mode switching and output power adjustment in accordance with the present invention. Generally speaking the effect of combined mode switching and output power adjustment in accordance with the present invention, as compared to only mode switching, is to somewhat decrease the speech quality for the less channel protected modes and to increase the speech quality of the more channel protected modes, thus giving a more even speech quality over a large range of C/I levels.

Figure 16:
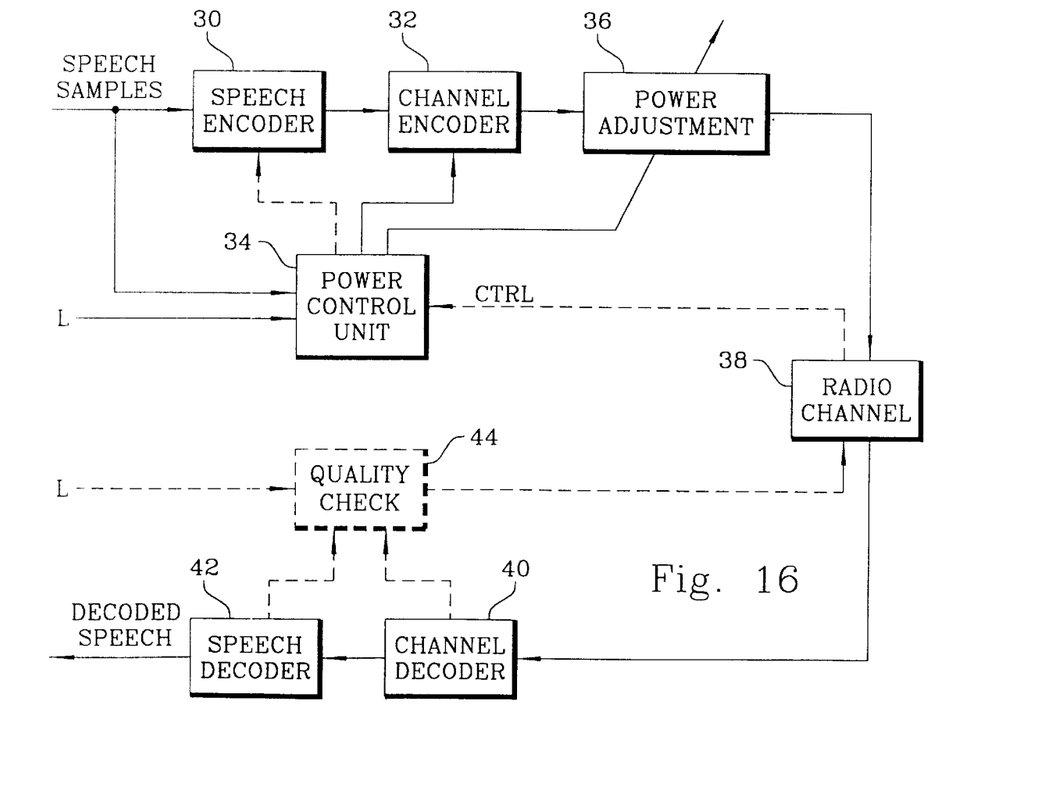
FIG. 16 is a simplified block diagram of a system operating in accordance with the present invention.

FIG. 16 is a simplified block diagram of a system operating in accordance with the present invention. In order to simplify the description only blocks that are essential to the present invention have been included.

A speech encoder 30 receives and encodes speech samples. Speech encoder 30 may be a variable rate or embedded speech encoder (a variable rate encoder may also be implemented by switching between several fixed rate encoders). Encoded speech is forwarded to a channel encoder 32, which has a channel encoding mode corresponding to each speech encoder mode. The output from channel encoder 32 fits into a constant gross bit rate.

A power control unit 34 controls channel encoder 32 to operate in the proper channel encoding mode. Power control unit 34 also controls speech encoder 30 if it is of variable rate type (this is indicated by the dashed line between power control unit 34 and speech encoder 30). If speech encoder 30 is of the embedded type it is not necessary to control it, since it will always deliver a constant rate bit stream. In this case channel encoder will truncate necessary bits as required by the selected channel encoding mode. Such an embodiment is especially useful if power control unit 34 and speech encoder 30 are in different locations in the TDMA system and fast communication between them is difficult.

Blocks 30, 32, 34 are typically implemented as micro or micro/signal processor combinations.

Power control unit 34 also controls a power adjustment unit 36, typically an adjustable power amplifier, to increase or decrease the output power from the transmitter depending on the selected encoding mode.

As noted above the source signal itself is used to control power adjustment. This has been indicated by the line that forwards speech samples to power control unit 34. A feasible source signal controlled scheme is a scheme in which upper and lower encoded speech bit rates are determined. These limits may be determined on a call by call basis or be updated during a call. The source signal is used to determine a momentary encoded speech bit rate within these limits. Power is controlled by selecting a compatible channel encoding mode and adjusting the output power, for example In accordance with tabulated power values corresponding to the different modes. A back channel is not strictly necessary in this case.

If the source signal is divided into several classes each having several modes, the mode decision in power control unit 34 may also be partially based on local information L, such as measured signal strength, C/I, traffic or system load, etc describing the radio environment. Optionally an inband control channel, such as the above described CTRL channel, may be used as a back channel to convey quality information, such as the decoded bit error rate, from the receiving end back to the transmitting end.

A possible embodiment is to have source signal controlled mode switching combined with basic power adjustments for each mode in each speech class and fine tuning of power levels controlled by small radio environment changes. Basic power adjustments may be associated with each mode. These basic adjustments may be pre-calculated off-line and stored for later use. The basic power adjustments may be performed when there are drastic changes in radio conditions, for example due to shadowing. When there are only small changes in radio conditions only fine tuning of the output power around corresponding basic power levels is performed. This fine tuning adapts the output power to keep the received speech quality at an essentially constant level in the current mode.

After transmission over the radio channel 38 the received signal is decoded in channel decoder 40 and speech decoder 42. An optional quality check unit 44 receives quality information from channel decoder 40 and speech decoder 42. Locally measured information L (signal strength, C/I, etc.) may also be forwarded to quality check unit 44. After evaluation a speech quality measure, for example an estimated decoded bit error rate, is transmitted back to the transmitter on the back channel CTRL.

Figure 17:
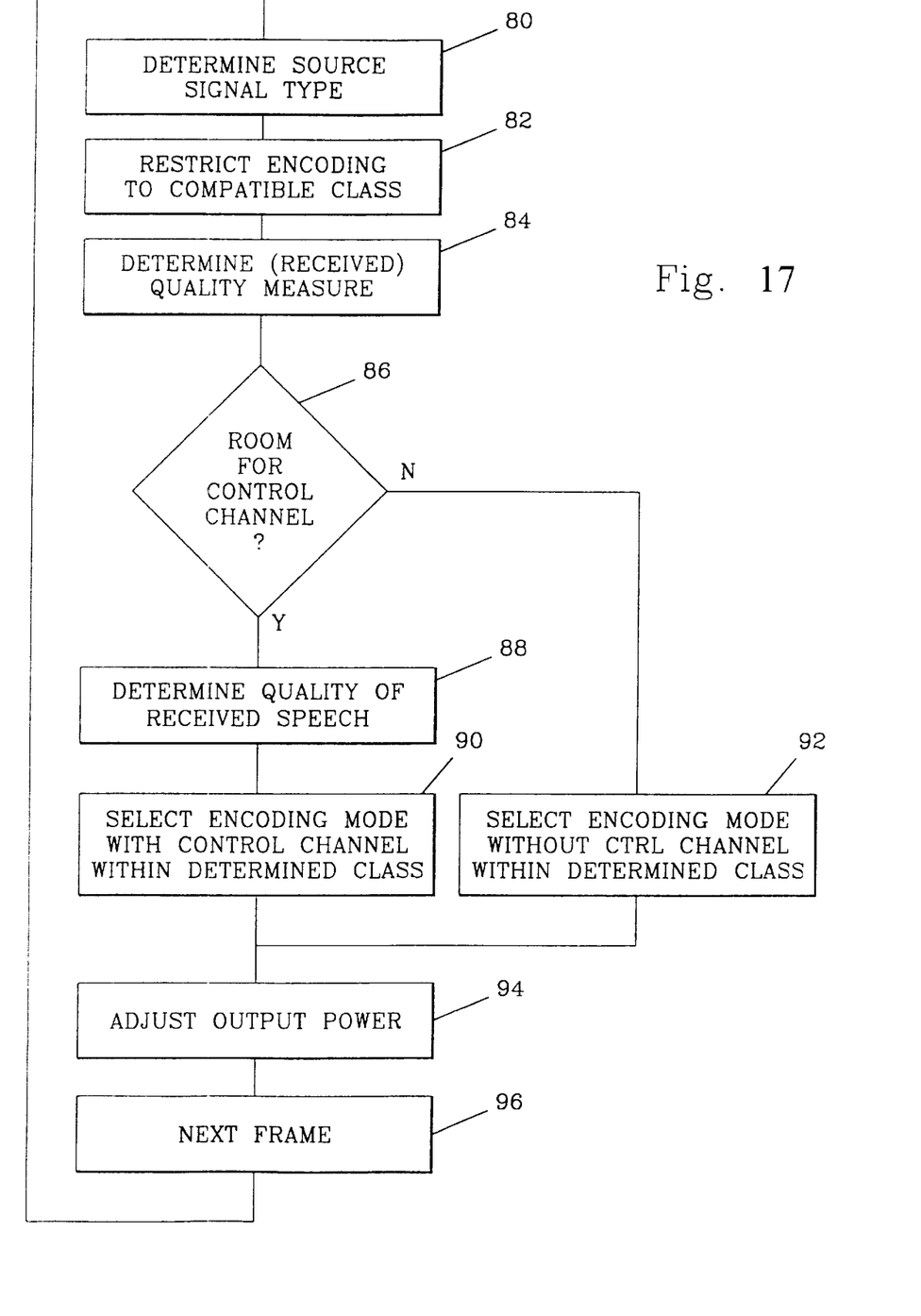
FIG. 17 is a flow chart illustrating an embodiment of the method in accordance with the present invention.

FIG. 17 is a flow chart illustrating an embodiment of the method in accordance with the present invention. Step 80 determines the source signal type (class). Step 82 restricts the encoding to a compatible class. Step 84 determines a quality measure (possibly transmitted over an inband control channel). Step 86 determines whether the quality measure is consistent with a mode that has room for a control channel.

If this is the case step 88 determines the quality of speech received at the transmitter. In step 90 an encoding mode with control channel for transmission of this information is selected. If there is no room for a control channel in step 86 a mode without such a channel is chosen in step 92. Step 94 adjusts the output power to the appropriate level. This adjustment may also include the above described fine adjustment when there is no mode change. Finally step 96 gets the next frame and returns to the beginning of the flow chart.

In the above description it has not been specified whether the transmitter is a base station or a mobile station. Since both stations include both a transmitter and a receiver this means that the system may be symmetrical. However, typically more information is available in one of the stations, usually the base station, which implies that it is natural to let this station control both its own as well as the other station's transmission mode.

The present invention leads to several advantages, namely:

A better TDMA system capacity due to the reduced interference level (the average interference level is reduced due to the reduced output power levels).

Signaling may be very fast, involving only the base station and the mobile station and not the base station controller (GSM) or mobile services switching center (no handover required).

The mode control algorithms and settings may vary between cellular operators, thus giving different service characteristics. This introduces a tool for tailoring the offered services towards different segments of the market.

It will be understood by those skilled in the art that various modifications and change may be made to the present invention without departure from the spirit and scope thereof, which is defined by the appended claims.

CITATIONS

[1] Dunlop J, Irvine J and Cosimini P, "Estimation of the Performance of Link Adaptation in Mobile Radio", IEEE Vehicular Technology Conference, VTC-95, Chicago 1994.

[2] Yuen E, Ho P and Cuperman V, "Variable Rate Speech and Channel Coding for Mobile Communication", IEEE Vehicular Technology Conference, VTC-95, Stockholm 1994.

[3] U.S. Pat. No. 5,353,373 assigned to Societa Italiano per I'Esercizio delle Telecomunicazioni P.A.

[4] U.S. Pat. No. 5,469,527 assigned to Societa Italiano per I'Esercizio delle Telecomunicazioni P.A.

What is claimed is:

1. A power control method in a TDMA radio communication system having traffic channels, at least some of which are associated with a set of speech/channel encoding modes, each mode having a different mix of speech encoder bit rate and data protection bit rate but the same total available gross bit rate, the method comprising the following steps at a transmitting end of a link using such a traffic channel:

replacing a mode allocated to the channel by another mode in the set having one of a higher and a lower data protection bit rate and a respective one of a lower and higher speech encoder bit rate if the sound to be encoded requires a respective one of a lower and higher speech encoding bit rate, thereby obtaining a respective one of a coding gain and a coding loss; and a respective one of reducing or increasing, based on a respective one of the coding gain and the coding loss, the output power of the traffic channel to a respective one of a lower and a higher level such that an estimated decoded speech quality measure at the receiving end of the link is substantially constant.

2. The method of claim 1, further comprising the steps of:

determining a current type of source signal to be encoded and transmitted on the link;

restricting encoding to a class of source/channel encoding modes compatible with the determined type of source signal, each mode in the class being defined by a different mix of source signal encoding and channel protection but the same total available gross bit rate, determining a quality measure for previously transmitted signals that have been received and decoded at the receiver; and selecting, based on the quality measure, a source/channel encoding mode from the class that is likely to give the best received and decoded signal at the receiver.

3. The method of claim 2, comprising the following steps at a receiving end of the link:

estimating the decoded speech quality measure;

requesting a mode change to the transmitting end on a return link from the receiving end to the transmitting end if the estimated decoded speech quality measure has changed more than a predetermined amount; and changing to a decoding mode that corresponds to the new received speech/channel encoding mode.

4. The method of claim 2, comprising the following steps at the transmitting end of the link:

estimating the decoded speech quality measure on a return link from the receiving end to the transmitting end;

using the estimated decoded speech quality measure at the transmitting end as a measure of the estimated decoded speech quality at the receiving end; and changing encoding mode if the estimated decoded speech quality measure at the transmitting end has changed more than a predetermined amount.

5. The method of claim 3, wherein a mode indicator field transmitted in the return channel identifies the encoding mode that is requested by the receiving end.

6. The method of claim 4, wherein a mode indicator field is transmitted together with the coded bits to identify the current encoding mode at the receiving end.

7. The method of claim 5, wherein the mode indicator field contains channel protection.

8. The method of claim 4, comprising the following steps at a receiving end of the link: decoding a received signal in several decoding modes corresponding to the speech/channel encoding modes; and selecting the decoding mode that is most likely to give the best decoded speech quality as the current decoding mode.

9. The method of claim 1, comprising the step of allowing only one of a receiving end and the transmitting end to control mode switching.

10. The method of claim 9, comprising the step of allowing only a base station to control mode switching.

11. The method of claim 1, wherein the estimated decoded speech quality measure comprises an estimated decoded bit error rate.

12. A power control system in a TDMA radio communication system having traffic channels, at least some of which are associated with a set of speech/channel encoding modes, each mode having a different mix of speech encoder bit rate and data protection bit rate but the same total available gross bit rate, the system comprising the following elements at a transmitting end of a link using such a traffic channel:

means for replacing a mode allocated to the channel by another mode in the set having one of a higher and a lower data protection bit rate and a respective one of a lower and a higher speech encoder bit rate if the sound to be encoded requires a respective one of a lower and a higher speech encoding bit rate, thereby obtaining a respective one of a coding gain and a coding loss, and means for doing a respective one of reducing and increasing, based on a respective one of the coding gain and the coding loss, the output power of the traffic channel to a respective one of a lower and a higher level such that an estimated decoded speech quality measure at the receiving end of the link is substantially constant.

* * * * *